Aug. 11, 1925.

S. B. WINN 1,548,966

TRACTOR TRAILER CONSTRUCTION

Original Filed May 28, 1920     3 Sheets-Sheet 1

Inventor
Sidney B. Winn,

Attorneys

Patented Aug. 11, 1925.

1,548,966

UNITED STATES PATENT OFFICE.

SIDNEY B. WINN, OF LAPEER, MICHIGAN.

TRACTOR TRAILER CONSTRUCTION.

Application filed May 28, 1920, Serial No. 384,947. Renewed November 22, 1924.

*To all whom it may concern:*

Be it known that I, SIDNEY B. WINN, a citizen of the United States of America, residing at Lapeer, in the county of Lapeer and State of Michigan, have invented certain new and useful Improvements in Tractor Trailer Constructions, of which the following is a specification, reference being had therein to the accompanying drawings.

This invention relates to tractor-trailer constructions which are embodied in a motor vehicle having a trailer detachable relative to a truck so that there will be separate vehicular units.

The trailer is characterized by a novel support at its forward end for maintaining the trailer in an operative and useful condition when detached from a truck. The support has ground engaging wheels adapted to cooperate with the rear wheels of the trailer in providing a four wheel vehicle that may be moved about independent of a truck or tractor, and provision is made for raising and lowering the wheeled support when the trailer is to be coupled to or uncoupled from a tractor.

The trailer is further characterized by rollable members at its forward end which permit of a tractor being backed into engagement with the trailer to be automatically coupled thereto, said rollable members constituting one of the main elements of a fifth wheel or swiveled connection which permits of a universal connection being established between the tractor and trailer so that the latter may be conveniently moved by the former.

The trailer is still further characterized by a novel brake mechanism, which may be operated from a tractor or independently thereof, thus permitting of the entire vehicle being controlled when in motion or the trailer controlled independent of the tractor and as a separate vehicular unit.

The tractor is characterized by a novel fifth wheel construction which together with a fifth wheel element of a trailer constitutes a universal coupling between a tractor and trailer and permits of the vehicle being operated in a comparatively small space.

The tractor is further characterized by an operating mechanism which permits of the driver or operator of the tractor controlling the brake mechanism of the trailer attached thereto, and the constructive arrangement of the tractor-controlling mechanism is such that safe and expeditious coupling or uncoupling may be accomplished without the driver leaving the seat of the tractor.

Various other features of the tractor-trailer combination will appear and be better understood when considering the construction entering into my invention, so reference will now be had to the drawings, wherein.

Figure 1:
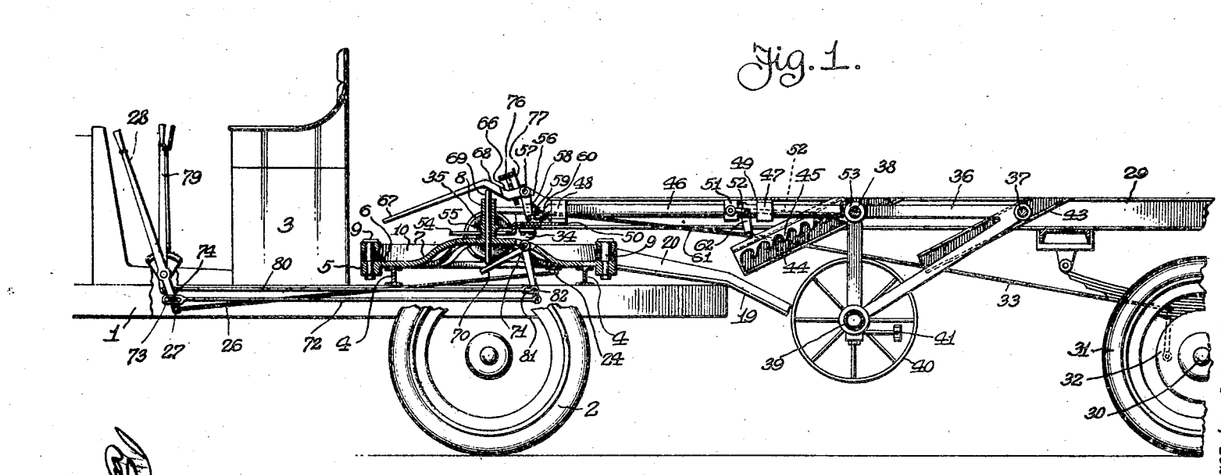
Figure 1 is a side elevation of the tractor trailer showing each unit partly broken away and partly in section.
Figure 2:
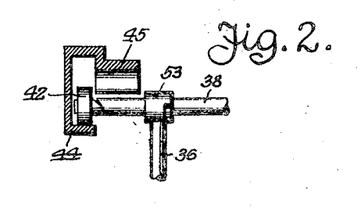
Fig. 2 is an enlarged detail sectional view of a combined support, guide and locking device.

The motor truck or tractor is of a conventional form including,—interalia—a chassis 1, a rear set of wheels 2, and a driver or operator's seat 3 suitably mounted on the chassis 1 contiguous to the rear end thereof.

Figure 4:
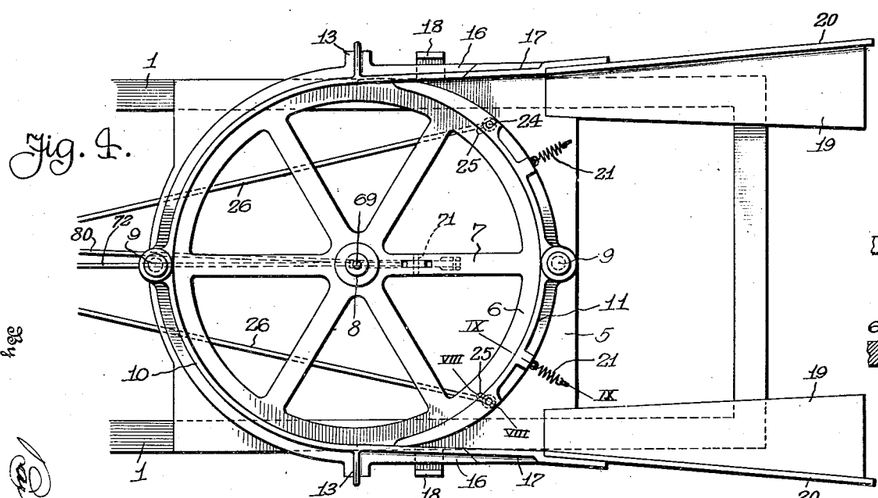
Fig. 4 is an enlarged plan of a portion of the tractor showing a combined coupling and fifth wheel construction.
Figures 5, 8:
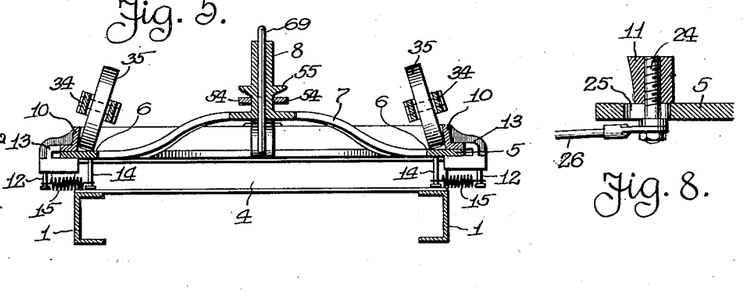
Fig. 5 is a cross sectional view of the same.
Fig. 8 is an enlarged cross sectional view taken on the line VIII—VIII of Fig. 4.

Mounted on the rear end of the chassis 1 are transverse members 4 supporting a fifth wheel construction comprising a stationary member 5 providing a circular track or slide-way 6 and the central portion of the stationary member 5 is preferably in the form of a raised or convex spider 7 having a central tubular king post 8, which serves somewhat the same purpose as a king bolt in ordinary carriage construction. The central spider or skeleton construction of the stationary member 5 reduces the weight of the same and permits of the king post 8 being supported at an elevation relative to the stationary member.

Pivoted on the stationary member 5, in the central longitudinal vertical plane of the tractor, by bolts 9 or other pivotal means, are yieldable front track wall members 10, and adjustable and yieldable rear track wall members 11, said members being curved so as to form a complete circular substantially vertical wall on the track 6, as best shown in Figs. 4 and 5. The track wall members 10 and 11 are inclined inwardly at an obtuse angle relative to the track 6 and said members are preferably angular in cross section so that there will be lateral flanges to slide on the stationary member 5 when the track wall members are moved. The members 10 cooperate in forming a semi-circular wall at the front edge of the track 6, and these wall members have diametrically opposed slide brackets 13 extending under the side edges of the stationary member 5, as best shown in Fig. 5, said slide brackets preventing vertical displacement of the track wall members 10 when yielding in an outward direction relative to the stationary member. The slide brackets 13 have depending pins 12 connected to similar pins 14 of the stationary member 5 by coiled retractile springs 15 and the retractile force of these springs holds the ends of the wall members 10 so that the ends of said members may yield when excessive pressure is brought to bear against said members in outward lateral directions.

The yieldable track wall members 10 have tangentially and rearwardly extending end portions 16 located along the side edges of the stationary member 5 and normally having a mitered or beveled engagement with stationary members 17 carried by the stationary member 5 at the rear end of the member 5. The end portions 16 are movable with the yieldable track wall members 10, and are limited in their outward movement by stops 18 carried by the side edges of the stationary member 5.

Adjoining the rail members 17 are stationary diverging rails 19 having side flanges 20 in alinement with the stationary rail members 17, so that the members 17 and the flange 20 will represent continuations of the rail portions 16 of the yieldable track wall members 10. As best shown in Fig. 1, the rails 19 extend rearwardly from the stationary member 5 and downwardly on to the rear end of the chassis 1, so as to form a track leading from the rear end of the chassis 1 to the stationary member 5.

Figure 9:
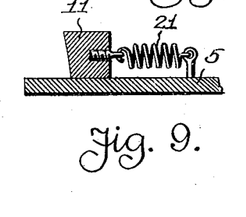
Fig. 9 is a similar view taken on the line IX—IX of Fig. 4.

The rear yieldable and adjustable track wall members 11 have the free ends thereof normally engaging the end portions 16 of the front track wall members 10 so that the rear track wall members cooperate with the front track wall members in providing a circular fifth wheel member that may be opened and closed to permit of another fifth wheel member entering and cooperating therewith in forming a complete fifth wheel structure. The ends of the rear track wall members 11 are held in engagement with the end portions 16 by the expansive force of springs 21 connecting the member 11 to the stationary member 5. This detail of construction is best shown in Fig. 9 where it will be noted that the cross-sectional shape of each of the members 11 permits of the springs 21 being readily attached thereto.

To shift the members 11 inwardly and open the fifth wheel the members 11, adjacent the ends thereof, have depending bolts 24 extending through slots 25 of the stationary member 5 and coupled to the lower end of the bolts 24 are forwardly extending converging cables or rods 26, which have the forward ends thereof pivotally connected, as at 27, to an operating lever 28. This operating lever is pivotally supported adjacent the seat 3 and will be hereinafter referred to.

Considering the trailer construction there is a chassis or body 29 which has its rear end supported by a rear axle construction or truck 30 which has its ground engaging wheels 31 provided with brakes 32 of a conventional form adapted to be controlled by rods 33.

At the forward end of the trailer chassis 29 are forwardly extending side journal boxes or bearings 34 for inwardly inclined wheels or casters 35 adapted to travel on the rails 19 and the stationary member 5, the wheels 35 constituting a fifth wheel member which enters the fifth wheel member of the tractor and travels on the circular walled track afforded by the stationary member 5. The wheels 35 have rounded peripheries and said wheels are disposed at diverging angles so that said wheels, when encountering the rails 19, will have a tendency to center the trailer relative to the tractor. The angularity of the wheels 35 causes said wheels to ride against the walls of the track members 10 and 11 with a minimum degree of friction, said wheels presenting an edge contact with the track members, as best shown in Fig. 5, instead of a side contact. By placing the wheels 35 in front of the forward end of the trailer chassis 29, it is possible to have the forward end of the chassis in proximity to the fifth wheel of the tractor instead of some distance above the fifth wheel as would be the case if the wheels 35 were located under the forward end of the trailer chassis. The wheels 35 constitute a rollable fifth wheel member for the forward end of the trailer and permit of the trailer being moved with the same facility as a wagon.

To permit of the forward end of the trailer chassis 29 being supported independent of the tractor and moved as a unit there is a novel wheel support arranged below the trailer chassis and adapted to be raised and lowered relative thereto, so that when the trailer is independent of the tractor the support may cooperate with the truck 30 in permitting of the trailer being moved about or safely supported for loading and unloading purposes.

The support comprises triangular frames 36 connected by transverse axles 37, 38 and 39. The axle 39 has ground engaging wheels 40, supported at the ends of the axle so as to be steered by a suitable steering mechanism 41.

Figure 3:
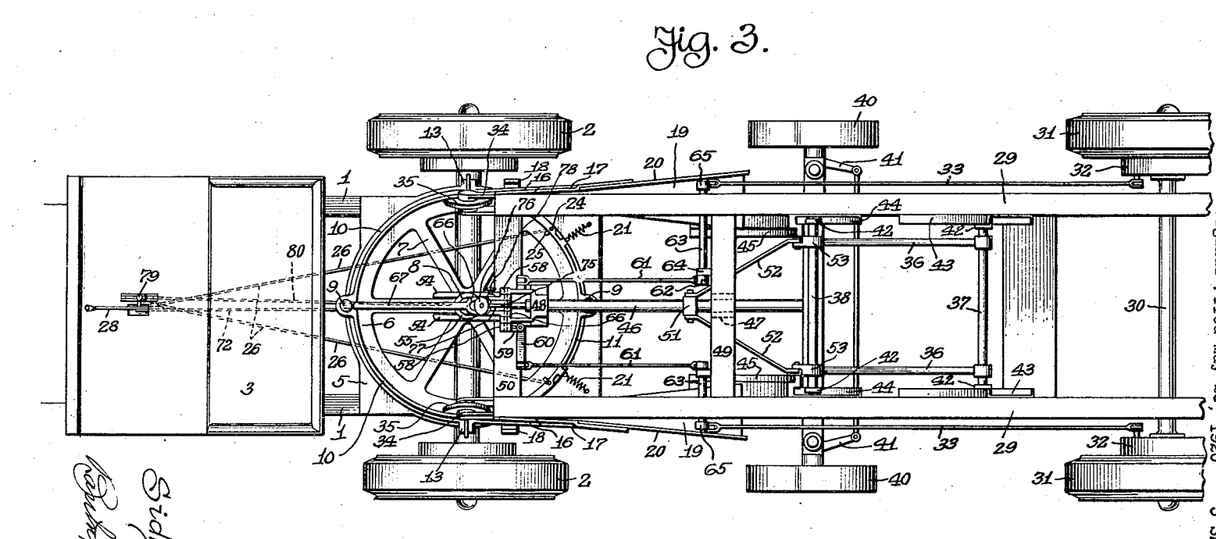
Fig. 3 is a plan of the tractor-trailer construction as shown in Fig. 1.

The ends of the axles 37 and 38 are provided with rollers 42, adapted to travel in inclined ways 43 and 44, said ways being arranged in sets, one in advance of the other, and each way somewhat channel shaped in cross section with the open sides of the ways of each set confronting each other, as best shown in Fig. 3. The sets of ways are inclined downwardly and forwardly and constitute guiding means for the axles 37 and 38 to permit of the axle 39 being raised and lowered relative to the trailer chassis 29. The inclined ways 44 differ from the set of inclined ways 43 by having inner scalloped or notched flanges 45, the notches of the flanges receiving the axle 38 when the support is lowered and made active to support the forward end of the trailer chassis 29.

The support, when released, may descend by gravity until it rests on the ground and then, as the front end of the trailer continues its downward movement, the notched flanges 45 of the inclined ways 44 will engage on the axle 38 and lock the support against further movement of the forward end of the trailer chassis 29. With a series of notches in the flanges 45, as shown in Fig. 1, uneven or irregular ground will not interfere with the locking of the axle 38 relative to the ways 44, and since the triangular shaped frames 36 are supported by the axle 39 there is no danger of the support slipping from under the trailer chassis or tilting in one direction or the other after the axle 38 engages the notched flanges 45.

To hold the support in an elevated position, as shown in Fig. 1, a slide rod 46 is arranged in bearings 47 and 48, carried by transverse members 49 and 50 of the trailer chassis 29. Adjacent the rear end of the slide rod 46 is a head 51 connected by diverging rods 52 to coupling members 53 on the axle 38. The rods 52 are pivotally connected to the coupling members 53 so that when the rod 46 is reciprocated the support is permitted to be raised and lowered. The forward end of the slide rod 46 is reduced and is adapted to engage the king bolt 8 when the tractor and trailer are coupled, thus setting up a constant pressure against the slide rod 46 to hold the support in an elevated position. When the tractor moves away from the trailer, thus changing the position of post or bolt 8 relative to the trailer, the slide rod 46 is permitted to advance relative to the trailer under the pressure of the wheeled support as the support descends by gravity, the latter thus automatically assuming a position to substantially firmly support the forward end of the trailer when not attached to the tractor. When the rear end of the tractor is backed under the forward end of the trailer the king post 8 impinges against the reduced end of the slide rod 46 and forces said rod rearwardly, so that the support will be elevated as the tractor continues its backing movement and remains so sustained by post 8 and slide 46 during the movement of the trailer by the tractor.

The transverse member 50 at the forward end of the trailer chassis 29 has a central forwardly projecting fork or bifurcated extension 54 which receives the king post 8 below a collar 55 thereof, said collar and fork cooperating in preventing vertical displacement of the forward end of the trailer when supported on the rear end of the tractor. The fork 54 also serves in conjunction with the king post 8 as a central swivel for the trailer relative to the tractor while the load at the forward end of the trailer is sustained by the fifth wheel member thereof bearing on the fifth wheel member of the tractor. The trailer is therefore coupled to the tractor so that the forward end of the trailer can not become laterally or vertically displaced during the operation of the trailer by the tractor, and since it is desirable to control the brakes 32 of the trailer from the tractor and also while the trailer is independent of the tractor the following brake mechanism is employed.

Figures 6, 7:
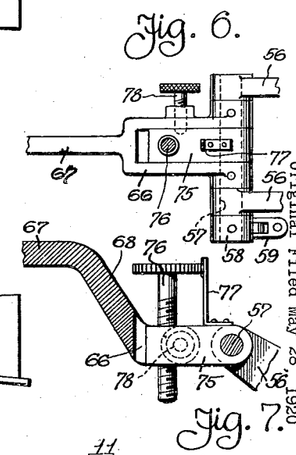
Fig. 6 is an enlarged plan of a portion of the trailer brake mechanism.
Fig. 7 is a longitudinal sectional view of the same.

Extending forwardly from the bearing 48 of the trailer are brackets 56 and journaled in said brackets is a rock shaft 57. Fixed on one end of the rock shaft 57 is a crank 58 connected by a link 59 to an equalizing cross head 60, and said cross head is connected by rearwardly extending rods 61 to the inner cranks 62 of transversely alining rock shafts 63 journaled in suitable bearings 64, the bearings 64 being carried by the transverse member 49 on the chassis 29 of the trailer. On the outer ends of the rock shaft 63 are cranks 65 and it is on these cranks that the rods 33 are connected. The manner of articulating the rock shaft 57 indirectly with the brakes 32 permits of said brakes being set or released.

Fixed on the rock shaft 57, between the brackets 56, is the bifurcated or forked end 66 of a lever 67, said lever having an angular portion 68 normally engaging a vertical pin 69 slidable in the king post 8. The lower end of the pin 69 engages a bell crank 70 pivotally mounted, as at 71, in an opening provided therefor in the stationary member 5, said bell crank extending below the stationary member 5 so that it may have its long arm pivotally connected by a rod 72 to the operating lever 28, said rod having a longitudinally slotted head 73 into which extends a pin 74 carried by the lower end of the lever 28.

Loose on the rock shaft 57, in the bifurcated or forked end 66 of the lever 67 is a release arm 75 having its outer end provided with a screw 76 and the lower end of said screw is adapted to be engaged by the slide rod 46. The upper end of the screw 76 has a knurled or toothed head normally engaged by a resilient detent or locking device 77 which prevents accidental rotation of the screw 76 relative to the arm 75. The arm 75 is adapted to be fixed for movement with the lever 67 by a set screw or transverse pin 78 carried by the bifurcated or forked end 66 of said lever and engaging in the side of the arm 75.

In addition to the operating lever 28, there is a brake lever 79 and said brake lever is connected by a rod 80 to the long arm of the bell crank 70, said brake rod having a slotted head 81 into which extends a pin 82 of the bell crank 70.

Considering the operation of the tractor trailer and assuming that the trailer is to be moved by the tractor, the yieldable track wall members 10 and 11 serve functionally as a draft appliance by permitting of a limited degree of yieldability existing between the rear end of a tractor and the forward end of a trailer, thus compensating for jars, stresses and strains that might otherwise be transmitted to the trailer from the tractor while the trailer is being pushed or pulled by the tractor.

When a grade is to be descended and the use of brakes are necessary, particularly with a loaded trailer, the driver or operator of the tractor manipulates the brake lever 79. As this lever is pulled upon, the bell crank 70 is actuated by the rod 80 and the pin 69 is raised to elevate the lever 67. As this lever is articulated with the brake 32 through the medium of the elements 57, 58, 59 and 60, 61 to 65 inclusive, it is apparent that the brakes 32 may be applied so that the driver or operator of the tractor can control the movement of the trailer.

Assuming that it is desired to detach or uncouple a tractor relative to the trailer, the driver or operator manipulates the lever 28 and due to the manner in which the rods 72 and 80 are connected to the bell crank 70, the lever 28 can be manipulated independent of the lever 79. Pulling on the lever 28 causes the bell crank 70 to actuate the pin 69 and set the brakes 32. Since the pin 69 will be elevated the lever 67 will ride on the pin, retaining the brakes set, until the rod 46 engages the screw 76 and holds the brakes set. Pulling on the lever 28 causes the rod 26 to open the adjustable track wall members 11 of the tractor fifth wheel construction, so that there will be sufficient space between the ends of the track members 11 and the end portions 16 of the track members 10 for the wheels 35 to pass out of the fifth wheel member of the tractor when the tractor pulls away from the trailer. The operation of the lever 28 will hold the tractor fifth wheel member open and the brakes set so that the trailer will be held against movement during the pulling away of the tractor and as the tractor leaves the trailer, the slide bar 46 temporarily remains in engagement with post 8 and advances as the gravity-descending support moves downward, then interlocks with the notched flanges 45 of the inclined ways 44 due to the weight of the trailer, and supports the forward end of the trailer when released by the tractor. As the slide bar 46 moves forwardly, the reduced zone at the forward end of the slide bar passes beyond the screw 76 and the screw then rides on to the main portion of slide bar 46, consequently the lever 67 is maintained elevated by the screw 76 and the slide bar 46 so that the brakes 32 will remain set.

There are instances when it is desirable to move the trailer from one location to another, independent of the tractor, when loading or unloading, consequently it is necessary that some provision be made for releasing the brakes 32. This has been attained through the medium of the releasing arm 75 and the screw 78. The screw 78 can be adjusted to release the arm 75 relative to the lever 67, so that the screw 76 no longer supports the lever 67 in an elevated position. With the arm 75 releasing the lever 67, it is obvious that the brakes 32 are released and through the medium of the steering wheels 40 of the support, the trailer may be moved to a desired location. By then fixing the arm 75 relative to the lever 67, the lever 67 may again be maintained in an elevated position to hold the brakes 32 set, and thus prevent accidental movement of the trailer, particularly when on a grade and also when the tractor is being backed under the forward end of the trailer to be coupled thereto.

With the lower ends of the rails 19 below the plane of the wheels 35 of the trailer the rails 19 will eventually impinge against the wheels 35 as the tractor is backed under the trailer. The wheels 35 will rotate and tend to properly center the forward end of the trailer relative to the tractor, and as the wheels 35 engage the track wall members 11, said members are forced open and the wheels 35 enter the tractor fifth wheel and limit the backing under movement of the tractor relative to the trailer. This operation is automatic as the members 11 have a snap closing action, somewhat similar to switch points, so that the tractor fifth wheel member will close and retain the wheels 35 on the circular track afforded by the stationary member 5. As this coupling or attaching operation takes place, the king post 8 first engages the forward end of the slide rod 46 and then shifts the rod rearwardly, causing said rod to elevate the wheeled support to the position shown in Fig. 1.

There is still a further feature of my invention which includes an automatic braking action for the trailer relative to the tractor. By reference to Fig. 1 it will be noted that the fork 54 permits of the forward end of the trailer shifting back and forth relative to the rear end of the tractor and that the inclined portion 68 of the lever 67 engages the upper end of the king pin 69. Should a load on the trailer cause the trailer to excessively crowd or push the tractor, the lever 67 will ride upwardly on the upper end of the pin 69, as the forward end of the trailer moves over the rear end of the tractor, causing the lever 67 to partially apply the brakes and retard the forward movement of the trailer.

It is thought that the operation and utility of the tractor trailer construction will be apparent without further description, and while in the drawing there is illustrated a preferred embodiment of my invention, it is to be understood that the structural elements are susceptible to such variations and modifications as fall within the scope of the appended claims.

What I claim is:—

1. In a tractor trailer construction, a trailer adapted to be moved by a tractor and independent thereof, a truck at one end of said trailer, and a movable support for the opposite end of said trailer, said support being bodily movable relative to the length of and at a substantially constant angle to the trailer.

2. A tractor trailer construction as characterized in claim 1, wherein inclined guide ways on said trailer support and guide said support.

3. In a tractor trailer construction, a trailer having a truck at one end thereof and adapted to be moved independent of the tractor, a wheeled steerable support for the forward end of the trailer bodily movable relative to the length of the chassis of said trailer and at a substantially constant angle thereto, and means carried by said trailer for guiding said support.

4. A tractor trailer construction as characterized in claim 3, wherein said support is in the form of side frames connected by axles and some of said axles guided by the means of said trailer.

5. In a tractor trailer construction, a trailer having a forward end adapted to be supported by and moved by a tractor, supporting means for the forward end of the trailer independent of the tractor, said supporting means being bodily movable to and from a supporting position for said trailer, the movement of the means being at a substantially constant angle to the direction of length of the trailer, and means on said trailer to engage said supporting means and maintain said supporting means in an active supporting position.

6. A tractor trailer construction as characterized in claim 5, wherein the means on said trailer serves as a guide for said supporting means.

7. A tractor trailer construction, a trailer having an end adapted to be supported by and moved by a tractor, supporting means for the end of the trailer independent of the tractor inclined guide ways for said supporting means, and means carried by said guideways brought into engagement with said supporting means to prevent movement of said supporting means in said guide ways when supporting said trailer.

8. A tractor trailer construction as characterized in claim 7, wherein said supporting means includes connected side frames, and rollers movable in said guide ways.

9. In a tractor trailer construction, a trailer having an end adapted to be supported by and moved by a tractor, supporting means for the end of the trailer independent of the tractor, said supporting means being bodily movable at a substantially constant angle to said trailer, and means centrally of said trailer and operable at the front end thereof for maintaining said supporting means in inactive position adjacent said trailer.

10. A tractor trailer construction as characterized in claim 9, wherein said supporting means includes an axle, and the last mentioned means includes a slide rod articulated with said axle.

11. In a tractor trailer construction, a tractor, a trailer adapted to be moved thereby, a support for said trailer when independent of said tractor, said support comprising side frames, axles connecting said side frames, wheels on one of said axles, rollers on the other of said axles, and inclined guideways carried by said trailer in which said rollers operate so that said support may be shifted relative to said trailer.

12. A tractor trailer construction as characterized in claim 11, wherein some of said inclined guideways have notched flanges to receive one of said axles.

13. In tractor-trailer constructions, a tractor having a fifth-wheel formation, a track leading to said formation, and a trailer having a fifth-wheel member adapted to ascend the track and enter the tractor fifth wheel formation during the coupling operation, said tractor fifth wheel formation having means spaced from the axis of the formation adapted to co-operate with the trailer fifth wheel member to produce the draft relation between the tractor and trailer when coupled, the position of said means locating it in the path of travel of the trailer fifth wheel member to and from the member draft position with the means normally in position to obstruct such path of travel, the trailer fifth wheel member being active to automatically shift the means out of such normal position solely during the coupling period and after the fifth wheel member has been raised to the coupling plane.

14. In tractor-trailer constructions, a tractor having a fifth wheel formation, a track leading to said formation, and a trailer having a fifth wheel member adapted to ascend the track and enter the tractor fifth wheel formation during the coupling operation, said tractor fifth wheel formation having means spaced from the axis of the formation adapted to co-operate with the trailer fifth wheel member to produce the draft relation between the tractor and trailer when coupled, said trailer fifth wheel member being in the form of opposed wheels adapted to travel about the tractor fifth wheel formation.

15. In a tractor trailer construction, a tractor, a trailer, a fifth wheel construction detachably connecting said trailer to said tractor, and yieldable track wall members forming part of said fifth wheel construction and serving as a draft appliance between said tractor and said trailer.

16. A tractor trailer construction as characterized in claim 15 wherein some of said track wall members are adjustable from the tractor.

17. In a tractor trailer construction, a tractor fifth wheel member affording a circular track, wall members for said track, means for moving some of said wall members, and a trailer fifth wheel member adapted to enter said tractor fifth wheel member by moving wall members thereof.

18. A tractor trailer construction, as characterized in claim 17, wherein said trailer fifth wheel member is in the form of wheels adapted to travel on the circular track when the wall members are closed.

19. In a tractor trailer construction, a tractor fifth wheel member affording a circular track, wall members for said track, means for moving some of said wall members, a trailer fifth wheel member adapted to enter said tractor fifth wheel member by automatically opening wall members thereof, and means on said tractor for guiding the fifth wheel member of said trailer on to the tractor fifth wheel member.

20. A trailer having a fifth wheel member, a tractor having a fifth wheel member composed of wall members cooperating in forming a circular track on which the trailer fifth wheel member travels, all of said wall members being yieldable and two of said members being adjustable.

21. A tractor trailer construction as characterized in claim 20, wherein means on said tractor permits of the adjustable wall members being adjusted from the driver's seat of the tractor.

22. A fifth wheel construction between vehicle parts comprising a stationary member on one vehicle part, wall members pivoted on said stationary member, cooperating with said member in forming a circular track, wheels on the other vehicle part adapted to travel on the circular track within the wall members, and means adapted for moving some of said pivoted wall members to permit said wheels withdrawing from said track.

23. A fifth wheel construction as characterized in claim 22, wherein said wheels are inwardly inclined for edge contact with said track and said wall members.

24. A fifth wheel construction comprising a stationary member a movable member adapted to travel about in said stationary member in an annular path and automatically enter said member in a horizontal plane, and means associated with said stationary member and operative to temporarily affect the continuity of such annular path for permitting said movable member to withdraw from said stationary member.

25. In a tractor trailer construction, a tractor, a trailer having a fifth wheel connection with said tractor, brakes for the trailer, a lever on said trailer for operating said brakes, and means on said tractor operable through the axis of said fifth wheel connection against said lever for setting and releasing said brakes, said means being positioned to eliminate the contact relation with the lever when the tractor and trailer are separated.

26. A tractor trailer construction as characterized in claim 25, wherein said means includes a king pin carried by the tractor and engaging said lever, and a bell crank for moving said pin.

27. In a tractor trailer construction, a tractor, a trailer, a fifth wheel construction between said tractor and trailer, establishing an operatable connection and permitting of said tractor and trailer being separated, a movable support for said trailer when independent of said tractor, means held by said fifth wheel construction maintaining said support inactive, and brakes for said trailer, said brakes being set when said means is released by said fifth wheel construction and said support assumes an active position.

28. A tractor trailer construction as characterized in claim 27, wherein said support is arranged to assume an active position by gravity, and means induced by the weight of the trailer on said support maintains said support in an active position.

29. In a tractor trailer construction, a tractor, a trailer, a fifth wheel construction between said tractor and trailer establishing an operatable connection and permitting of said tractor and trailer being separated, a movable support for said trailer when independent of said tractor, and means rendered active by the weight of the trailer on said support for maintaining said support locked in an active position while permitting bodily movement of the trailer, said means being automatically rendered inactive by the tractor and trailer coupling action.

30. In a tractor trailer construction, a tractor, a trailer, a fifth wheel construction between said tractor and trailer establishing an operatable connection and permitting of said tractor and trailer being separated, a movable support for said trailer when independent of said tractor, a slide rod articulated with said support and actuated by the backing of said tractor under said trailer to raise said support, said rod being released and said support lowered when said tractor withdraws from said trailer, brakes for said trailer, and means actuated by the release of said rod and the lowering of said support to set said brakes.

31. A tractor trailer as characterized in claim 30, wherein additional means on said trailer permits of said brakes being released when said trailer is uncoupled from said tractor.

32. In a tractor trailer construction, a tractor, a trailer, having a truck at one end and its opposite end adapted to be supported and detachably held by the tractor, a support carried by said trailer adapted to be raised when said trailer is attached to said tractor and lowered by gravity when said trailer is detached, brakes for said trailer, a lever on said trailer controlling said brakes, and means on said tractor simultaneously holding said support elevated and engaging said lever to retain said brakes released, said means permitting said support to lower and causing said lever to set the brakes when said tractor is being detached from said trailer.

33. A tractor trailer construction as characterized in claim 32, wherein said means constitutes an operative connection for said trailer with said tractor.

34. A tractor trailer construction as characterized in claim 32, wherein additional means associated with said lever permits of said brakes being released when said trailer is detached and independent of said tractor.

35. The combination of a tractor, a trailer, a brake mechanism on said trailer having a control lever at the forward end of said trailer, a movable support carried by said trailer and having a control rod adjacent the lever of said brake mechanism, and a post on said tractor adapted to engage and operate said rod and said lever, one in the advance of the other, so that said support is raised in advance of the brake mechanism releasing brakes.

36. The combination set forth in claim 35, wherein additional means at said post permits of said lever being actuated independent of actuation by said post.

37. The combination of a tractor, a trailer movable to and from a position wherein the forward end of the trailer overlies the tractor and having a swivel connection with the tractor when in such position, brakes for the trailer, a lever on said trailer for operating said brakes, and means on said tractor against which said lever is relatively movable to apply the brakes when said trailer crowds said tractor.

38. The combination set forth in claim 37, wherein additional means permit of said tractor means being adjusted by the operator of the tractor to cause application of the brakes.

39. In tractor-trailer combinations, wherein the tractor and trailer are adapted for combined or separate service operation at will, and wherein the tractor forms a support for the forward end of the trailer when coupled for combined service, a support for the trailer when the latter is under separate service conditions, said support including a rigid frame having a member extending in a substantially vertical direction, said support being movable between active and inactive positions, said frame being mounted to maintain the frame with its member in such substantially vertical relation throughout the length of frame travel between such positions, and movable means active in the control of the movements of the support between such positions, said means being carried by the trailer the movements of such means being controlled by relative movement of tractor and trailer in moving between coupled and uncoupled relation, said frame in moving between its active and inactive positions shifting the position of said member between parallel planes which intersect the length dimension of the trailer at spaced-apart points.

40. The combination with a trailer, of guides secured to said trailer, a movable element having its movements guided by said guides, a movable supporting member, guides for the supporting member adapted to permit bodily shifting of the member between active and inactive positions while preserving substantially the same relation to a vertical line passing through the member in any of its positions, and mechanism connecting said movable element with the supporting member and actuated by said movable element to move the supporting element from operative to inoperative position and control the movement of the supporting element in the reverse direction, the supporting member guides being arranged in such manner that the shifting movement of the member between active and inactive positions shifts the position of such vertical line a corresponding distance in the direction of length of the trailer.

41. The combination of a tractor, a trailer, a brake mechanism on said trailer, a brake operating mechanism on said tractor, and means detachably connecting said tractor and trailer to produce the characteristics of a pivotal connection on a vertical axis between the tractor and trailer, the brake operating mechanism of the tractor being operable axially of such pivotal connection, and the brake mechanism of said trailer including a control element operable independently of the brake operating mechanism of the tractor.

42. The combination of a trailer having a rear axle assembly, a shiftable leg supporting the forward end of the trailer from the ground, a bar protruding from the forward end of the trailer and adapted to be pushed rearwardly to shift said leg, a tractor adapted to have its rear end backed under the forward end of the trailer and engage said bar to cause elevation of said leg, and means operative at will to produce a coupled or uncoupled relation between the tractor and trailer.

43. In tractor-trailer combinations, wherein a tractor and trailer are coupled together for combined service and disengageable by uncoupling for independent service, and wherein the coupling and uncoupling operations are rendered active by relative movement of tractor and trailer in the direction of traction, a brake mechanism for the trailer, said mechanism being operable at will from the tractor when the tractor and trailer are coupled, means carried by the trailer for setting said brake mechanism by relative movement of tractor and trailer in such direction of traction, and normally-inactive means carried by the trailer and rendered active by such relative movement between tractor and trailer for maintaining the brake mechanism in its set condition during the period when the tractor and trailer are separated, said brake mechanism being operative to permit temporary release of the trailer brakes during the period when said latter means is in its position of activity.

44. The combination of a tractor, a trailer, brakes for said trailer, coupling and uncoupling mechanism for said tractor and trailer, a brake mechanism operable at will in the axis of swivelling action of said coupling and uncoupling mechanism for controlling the brakes of said trailer, and means set in operation by the relative movement of tractor and trailer to separate them for setting the trailer brakes and for maintaining them set when the trailer is separated from the tractor.

45. The combination set forth in claim 44, wherein the means includes a locking bar inactive during the coupled relationship of tractor and trailer and rendered movable by the separating action of tractor and trailer to maintain the trailer brakes in set condition.

46. In tractor-trailer combinations, wherein a tractor and trailer are coupled together for combined service and disengageable by uncoupling for independent service, and wherein the coupling and uncoupling operations are rendered active by relative movement of tractor and trailer in the direction of traction, a brake mechanism for the trailer, said mechanism being operable at will from the tractor when the tractor and trailer are coupled, means carried by the trailer for setting said brake mechanism by relative movement of tractor and trailer in such direction of traction, and normally-inactive means carried by the trailer and rendered active by such relative movement between tractor and trailer for maintaining the brake mechanism in its set condition during the period when the tractor and trailer are separated.

47. In a tractor-trailer combination, a trailer having an end adapted to be supported and moved by a tractor, supporting means for the end of the trailer independent of the tractor, an axle forming part of said supporting means, inclined ways for the ends of said axle to permit free movement of the axle relative to said ways between the active and inactive positions of the support, and means adapted to be engaged by the ends of said axle to prevent movement of said supporting means relative to said guideways when supporting said trailer.

In testimony whereof I affix my signature in the presence of two witnesses.

SIDNEY B. WINN.

Witnesses:
ANNA M. DORR,
KARL H. BUTLER.